(12) United States Patent
Schmidt (10) Patent No.: US 9,914,532 B2
(45) Date of Patent: Mar. 13, 2018

(54) SHOCK ABSORBER

(71) Applicant: SAFRAN LANDING SYSTEMS UK LTD, Gloucester (GB)

(72) Inventor: Robert Kyle Schmidt, Gloucester (GB)

(73) Assignee: SAFRAN LANDING SYSTEMS UK LTD, Gloucestershire (GB)

( * ) Notice: Subject to any disclaimer, the term of this patent is extended or adjusted under 35 U.S.C. 154(b) by 0 days.

(21) Appl. No.: 15/058,572

(22) Filed: Mar. 2, 2016

(65) Prior Publication Data
US 2016/0272309 A1    Sep. 22, 2016

(30) Foreign Application Priority Data
Mar. 19, 2015   (EP) .................................... 15159954

(51) Int. Cl.
| F16F 9/48 | (2006.01) |
| B64C 25/60 | (2006.01) |
| F16F 9/06 | (2006.01) |
| G01C 19/10 | (2006.01) |

(52) U.S. Cl.
CPC .............. B64C 25/60 (2013.01); F16F 9/062 (2013.01); G01C 19/10 (2013.01)

(58) Field of Classification Search
CPC ... F16F 9/062; F16F 9/36; F16F 9/185; B64C 25/60
USPC ....... 188/288, 289, 315; 244/102 SS, 104 FP
See application file for complete search history.

(56) References Cited

U.S. PATENT DOCUMENTS

| 2,735,634 | A | * | 2/1956 | Fosness | ................ | B64C 25/001 |
| | | | | | | 244/102 SS |
| 2,735,674 | A | * | 2/1956 | Smith et al. | ............ | B64C 25/60 |
| | | | | | | 244/104 FP |
| 3,007,694 | A | * | 11/1961 | Bingaman | .............. | B60G 17/04 |
| | | | | | | 267/64.26 |
| 3,237,726 | A | * | 3/1966 | Deyerling | ................. | F16F 9/32 |
| | | | | | | 188/269 |
| 3,304,076 | A | * | 2/1967 | Doversberger | ........... | F16F 9/06 |
| | | | | | | 267/64.25 |
| 3,365,188 | A | * | 1/1968 | Rumsey | .................. | F16F 9/486 |
| | | | | | | 267/128 |
| 3,802,523 | A | | 4/1974 | Clark | | |

(Continued)

FOREIGN PATENT DOCUMENTS

| CA | 2665963 | 11/2010 |
| EP | 1332963 | 8/2003 |

(Continued)

OTHER PUBLICATIONS

Extended European Search Report dated Sep. 2, 2015 for European Application No. 15159954.5-1754.

*Primary Examiner* — Christopher P Schwartz
(74) *Attorney, Agent, or Firm* — Ratnerprestia (57) ABSTRACT

An aircraft landing gear shock absorber having an inner housing portion slidably coupled within an outer housing portion, and a chamber which defines a sealed fluid volume for containing shock absorber fluid within the shock absorber. The chamber includes a moveable wall portion arranged to move between a first position and a second position, and in the second position the effective volume of the chamber is decreased such that the shock absorber fluid pressure increases, to provide a bump to the shock absorber.

11 Claims, 6 Drawing Sheets

(56) References Cited

U.S. PATENT DOCUMENTS

| | | | | |
|---|---|---|---|---|
| 3,991,863 A * | 11/1976 | Lee | ............... | F16F 9/486 |
| | | | | 188/289 |
| 4,007,894 A | 2/1977 | Hartel | | |
| 4,061,295 A * | 12/1977 | Somm | ............... | B64C 25/60 |
| | | | | 188/266.2 |
| 4,291,850 A * | 9/1981 | Sharples | ............... | B60G 17/04 |
| | | | | 244/102 SS |
| 4,529,180 A * | 7/1985 | Hill | ............... | B64C 25/60 |
| | | | | 188/276 |
| 4,597,548 A * | 7/1986 | Bergloff | ............... | B64C 25/60 |
| | | | | 188/297 |
| 4,623,049 A | 11/1986 | Warren | | |
| 4,805,882 A * | 2/1989 | Veaux | ............... | B64C 25/60 |
| | | | | 267/64.13 |
| 4,924,975 A * | 5/1990 | Woerner | ............... | F16F 9/364 |
| | | | | 188/322.18 |
| 5,214,586 A | 5/1993 | Nance | | |
| 5,521,827 A | 5/1996 | Lindberg | | |
| 6,032,090 A | 2/2000 | von Bose | | |
| 6,237,407 B1 | 5/2001 | Nance | | |
| 2003/0042661 A1 * | 3/2003 | Popjoy | ............... | F16F 9/0245 |
| | | | | 267/64.28 |
| 2006/0220918 A1 | 10/2006 | Stockwell | | |
| 2008/0119967 A1 | 5/2008 | Long | | |
| 2011/0180360 A1 | 7/2011 | Martin | | |
| 2011/0209955 A1 * | 9/2011 | Lavigne | ............... | B64C 25/60 |
| | | | | 188/322.13 |
| 2016/0298714 A1 * | 10/2016 | Schmidt | ............... | F16F 9/36 |
| 2016/0327114 A1 * | 11/2016 | Schmidt | ............... | F16F 9/006 |

FOREIGN PATENT DOCUMENTS

| | | |
|---|---|---|
| GB | 666511 | 2/1952 |
| GB | 1253988 | 11/1971 |
| WO | 9607087 | 3/1996 |
| WO | 2010142802 | 12/2010 |

* cited by examiner

SHOCK ABSORBER

This application claims the benefit of and priority to European Application No. EP15159954.5, filed Mar. 19, 2015, which is incorporated herein by reference in its entirety.

BACKGROUND TO THE INVENTION

Determination of the weight and balance of an aircraft is a critical safety operation. If operated outside of its weight and balance limits an aircraft may become unstable and unsafe.

It is known to perform weight and balance calculations which are calculated from the estimated mass of passengers, baggage and fuel etc. However these calculations are time consuming and generally give a conservative estimate that may leave the aircraft under loaded.

Automated systems that measure the weight and balance of an aircraft by measuring shock absorber pressure in the aircraft landing gear when the aircraft is loaded are also known. However, these measurements can be inaccurate due to static friction or 'stiction' caused by seals and bearings in the shock absorber.

One strategy to overcome the stiction is to provide a 'bump' to the shock absorber by increasing and decreasing the internal pressure in the shock absorber slightly before performing the measurement.

However known systems for providing a shock absorber bump have the potential to decrease the reliability of the shock absorber.

SUMMARY OF INVENTION

According to a first aspect of the invention there is provided an aircraft landing gear shock absorber comprising: an inner housing portion slidably coupled within an outer housing portion, the shock absorber including a chamber which defines a sealed fluid volume for containing shock absorber fluid within the shock absorber, characterised in that the chamber comprises a moveable wall portion, arranged to be moved by a motive force between a first position and a second position, wherein in the second position the effective volume of the chamber is decreased relative to when the moveable wall portion is in the first position such that the shock absorber fluid pressure increases to extend the shock absorber.

Thus the first aspect of the invention enables the shock absorber to be bumped by increasing pressure within the shock absorber by decreasing the available volume for the shock absorber fluid. This causes the pressure within the shock absorber to increase which causes the shock absorber to expand as the inner housing portion slides out of the outer housing portion slightly in response to the increase in pressure. Thus the stiction caused by bearings and seals located between the inner and outer housing portions can be overcome. The bump is achieved without adding or removing fluid from the chamber that contains the shock absorber fluid, so that shock absorber fluid is prevented from leaking out of the shock absorber in the event of a failure of the bump system.

Put another way, the moveable wall portion acts as a fail-safe, moving to the first position in the event of failure or removal of the motive force provider.

The shock absorber may further comprise a control port in fluid communication with a distal side of the moveable wall portion with respect to the chamber, the control port being arranged to be coupled to a source of control fluid for providing the motive force to move the moveable wall portion from the first position to the second position, wherein the control port is isolated from the sealed fluid volume by the moveable wall portion.

The control port may be a hydraulic or pneumatic control port or any other suitable control port. Preferably, the control port is a hydraulic control port.

Separating the control port from the sealed fluid volume with the moveable wall portion ensures that the sealed fluid volume remains sealed with respect to the control port, that is, shock absorber fluid is prevented from leaking out of the control port as the control port is blocked from the sealed fluid volume by the moveable wall portion.

The moveable wall portion can be moveable from the second position to the first position by shock absorber fluid pressure within the chamber.

Therefore, the moveable wall portion automatically returns to the first position (the normal operating position) if the pressure exerted on the moveable wall portion from the control port decreases due to, for example, a leakage in a hydraulic supply system that supplies the control port.

The moveable wall portion can comprise a floating piston.

The moveable wall portion can be moveable from the second position to the first position by an electrical actuator. For example, the moveable wall portion may be actuated using a linear ball screw actuator.

The chamber may be housed completely within an internal cavity defined by the inner and outer housing portions. This can reduce the profile and/or weight of the shock absorber. Walls of the chamber other than the moveable wall portion may be defined by the inner and/or outer housing portions.

The shock absorber can include an orifice support tube and the chamber can be partially defined by side walls of the orifice support tube.

The chamber can be partially located in an internal cavity defined by the inner and outer housing portions and partially located in a chamber extension unit which is directly fixed to a port in the outer housing portion so that the chamber extension unit is in direct fluid communication with the internal volume.

This arrangement is advantageous as no weak connection tube is required between the chamber extension unit and the rest of the chamber. Instead, the chamber extension unit forms part of the overall shock absorber housing. This can improve safety of the shock absorber as the chamber is defined by a rigid boundary, preventing leakage of fluid from the shock absorber.

The shock absorber can further comprise one or more stops, positioned to limit movement of the moveable wall portion beyond the first and/or second position.

This ensures that the change in volume of the chamber is well defined and repeatable and that the internal fluid pressure of the shock absorber returns to its original level after bumping. When the shock absorber is used as part of a weight and balance measurement system, this can improve the accuracy of the measurement. The position of the stop(s) may be chosen such that movement of the moveable wall portion is just enough to overcome the shock absorber stiction. For example, the moveable wall portion may be arranged to decrease the volume of the chamber by approximately 2 to 3% in order to overcome the shock absorber stiction.

According to a second aspect of the invention there is provided an aircraft landing gear including a shock absorber according to the first aspect.

According to a third aspect of the invention there is provided an aircraft weight and balance measurement system including a shock absorber according to the first aspect.

The moveable wall portion can comprise any suitable kind of rigid or flexible boundary that defines an edge of the enclosed fluid volume, such as a piston, a floating piston or a wall that can be actuated by any suitable mechanical means. Alternatively, the moveable wall portion can comprise, for example, a flexible membrane that can be moved between the first and second positions by stretching or inflating the membrane.

The shock absorber fluid can comprise any suitable fluid, which may be a liquid such as oil, or a gas. The shock absorber fluid can comprise one or more types of fluid. For example, the shock absorber fluid can comprise a combination of air and oil.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
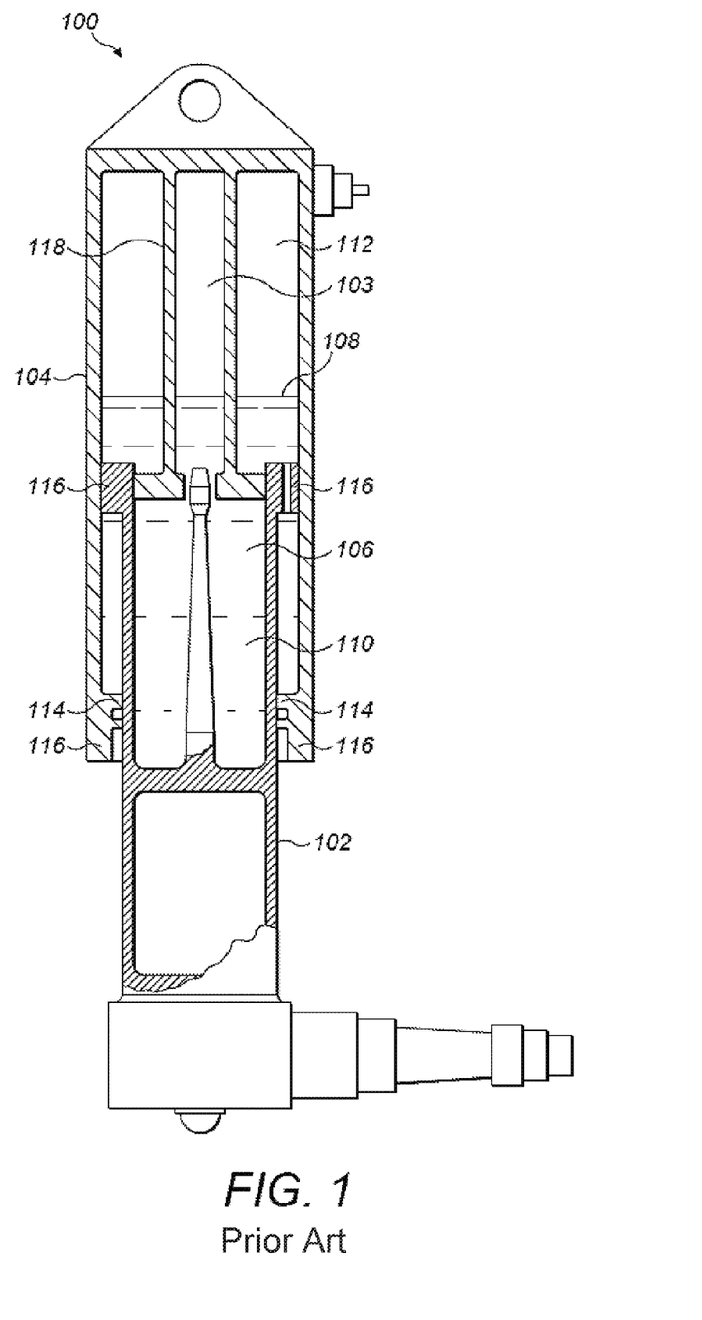
FIG. 1 is a schematic representation of a conventional oleo-pneumatic shock absorber.

Referring first to FIG. 1, an aircraft landing gear assembly comprising a conventional oleo-pneumatic shock absorber is shown generally at 100. The shock absorber 100 forms the main strut of the aircraft landing gear. The shock absorber 100 comprises an inner housing portion 102, slidably coupled in an outer housing portion 104. The inner and outer housing portions 102, 104 together define an internal cavity 106, which contains a shock absorber fluid 108. The internal cavity 106 contains oil 110 in a lower portion thereof and air 112 in an upper portion thereof. The oil 110 and air 112 together make up the shock absorber fluid 108.

Between the inner and outer housing portions 102, 104 are located seals 114 and bearings 116, which enable the inner housing portion 102 to slide within the outer housing portion 104 without any leakage of the shock absorber fluid 108 from the internal cavity 106. Thus, the internal cavity 106 defines a chamber 103 with a sealed fluid volume for containing the shock absorber fluid 108.

When a load is applied to the shock absorber 100, the inner housing portion 102 slides into the outer housing portion 104 and the shock absorber 100 is compressed. This causes a compression of the air 112 inside the internal cavity 106. When a load is removed from the shock absorber 100 the internal pressure of the shock absorber fluid 108 causes the inner housing portion 102 to slide out of the outer housing portion 104 so that the shock absorber 100 expands.

The shock absorber 100 also includes an orifice support tube 118, in the upper portion of the internal cavity 106 which defines a conventional damping orifice at its axial end.

Figure 2:
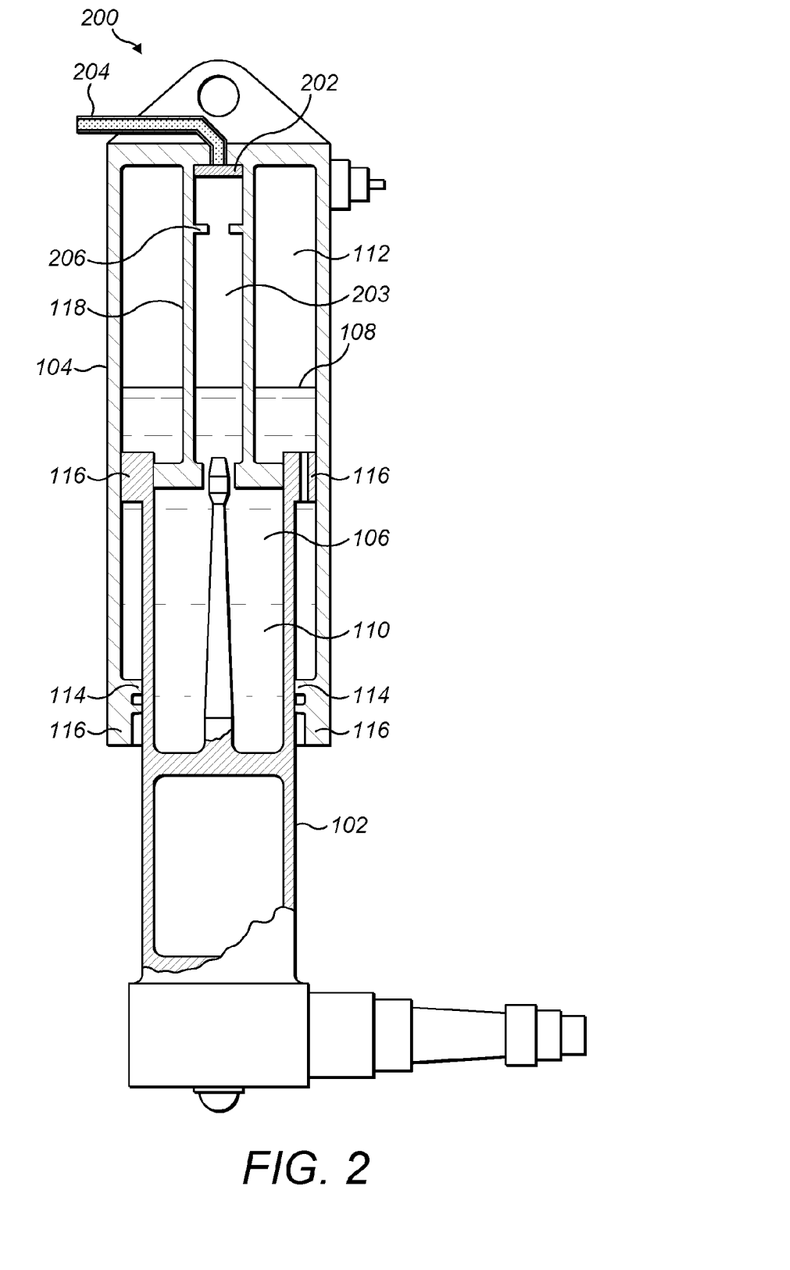
FIG. 2 is a schematic representation of a shock absorber according to a first embodiment, with a moveable wall portion shown in a first position.
Figure 3:
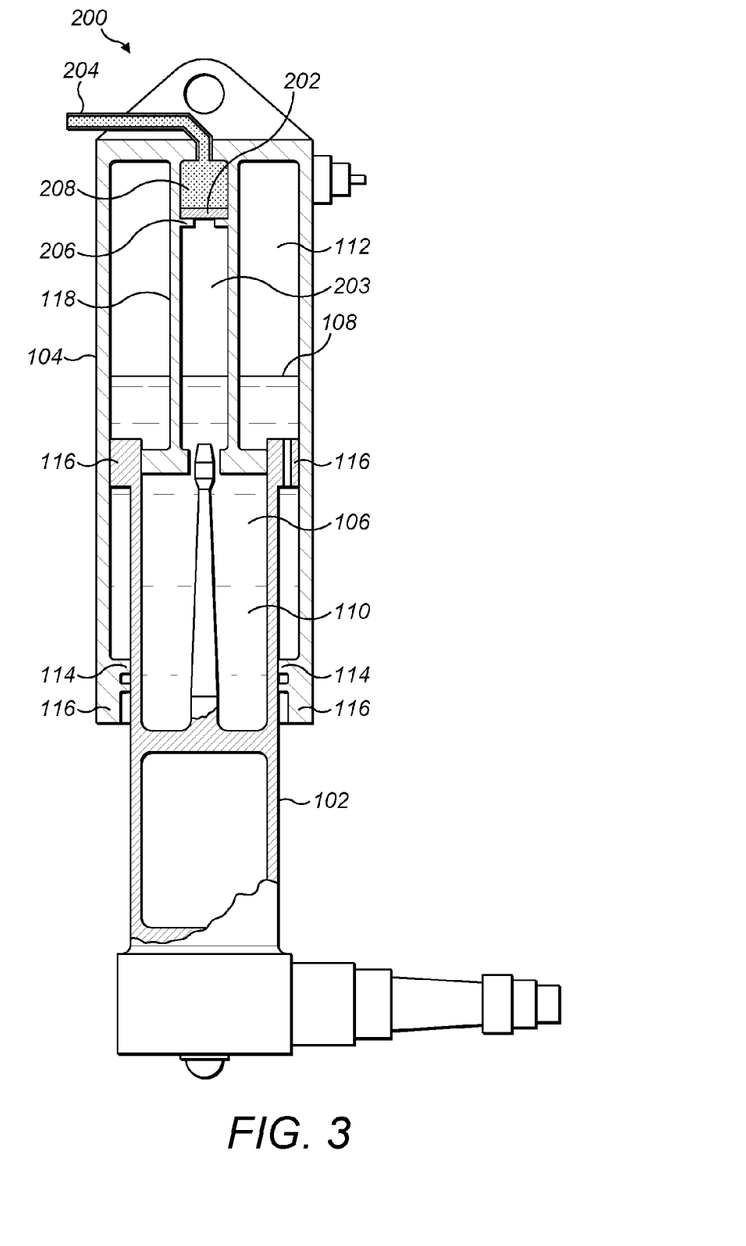
FIG. 3 is a schematic representation of the shock absorber of FIG. 2, with the moveable wall shown in a second position.

FIGS. 2 and 3 show an aircraft landing gear assembly. An aircraft landing gear shock absorber according to a first embodiment is shown generally at 200. The shock absorber 200 forms the main strut of the aircraft landing gear. The shock absorber 200 is similar to the shock absorber shown in FIG. 1, and like parts are labelled with like numerals.

The shock absorber 200 includes a moveable wall portion 202. The moveable wall portion 202 and the walls of the internal cavity 106 together form a chamber 203 which defines a sealed fluid volume that contains the shock absorber fluid 108. In the embodiment shown in FIG. 2, the moveable wall portion 202 is a floating piston located in an upper end of an orifice support tube 118 of the shock absorber 200. The moveable wall portion has a profile that corresponds to the profile of the orifice support tube 118 so that the moveable wall portion 202 can slide within the orifice support tube 118 whilst maintaining a fluid tight seal with the walls of the orifice support tube 118.

Any suitable floating piston design may be used for the moveable wall portion. For example, the moveable wall portion may comprise two seal sections that each have a profile that corresponds to the profile of the orifice support tube and are arranged to provide a fluid tight seal, the two seal sections separated by a spacer section in order to separate the working fluids and provide a level of redundancy in the event of a failure of one of the fluid tight seals.

A hydraulic control port 204 is provided in fluid communication with the upper end of the orifice support tube 118, on an opposite side of the moveable wall portion 202 from the chamber 203. When the shock absorber 200 is included in an aircraft assembly such as an aircraft landing gear, the hydraulic control port 204 may be connected to a control valve which may in turn be connected to the aircraft hydraulic return.

In FIG. 2, the moveable wall portion 202 is shown in a first position in which it abuts the end of the orifice support tube 118 and covers the hydraulic control port 204. Thus, when hydraulic fluid 208 is supplied to the hydraulic control port 204 (as shown in FIG. 3), a motive force in the form of a fluid pressure is exerted on the moveable wall portion 202 by the hydraulic fluid 208 which causes the moveable wall portion 202 to slide within the orifice support tube 118.

The orifice support tube 118 includes a stop 206 which protrudes from the internal walls of the orifice support tube 118 to create an effective profile that is smaller than the profile of the moveable wall portion 202. Thus, the moveable wall portion 202 slides down the orifice support tube 118 under pressure from the hydraulic control port 204, until it reaches a second position in which it contacts stop 206. The stop 206 then prevents the moveable wall portion 202 from sliding further down the orifice support tube 118.

Additionally or alternatively, the quantity of hydraulic fluid 208 supplied to the orifice support tube 118 can be controlled by the hydraulic control port 204 so that the moveable wall portion 202 is held in the second position by the relative pressure exerted on the moveable wall portion 202 by the hydraulic fluid 208 and the shock absorber fluid 108.

FIG. 3 shows the moveable wall portion 202 in the second position. The portion of the orifice support tube 118 between the moveable wall portion 202 and the hydraulic control port 204 is filled with hydraulic fluid 208, which continues to exert pressure on the moveable wall portion 202 to retain the moveable wall portion 202 in the second position.

When the moveable wall portion 202 is in the second position, the volume of the chamber 203, and thus the sealed fluid volume, is effectively decreased. The decrease in size of the sealed fluid volume causes an increase in pressure of the shock absorber fluid 108. This in turn causes an expansion of the shock absorber 200 such that the shock absorber fluid pressure returns to an equilibrium. The expansion of the shock absorber 200 is enough to overcome the stiction of the seals 114 and bearings 116.

Withdrawal of hydraulic fluid 208 through the hydraulic control port 204 decreases the pressure behind the moveable wall portion 202 such that the pressure exerted on the moveable wall portion 202 by the shock absorber fluid 108 is greater than the pressure exerted on the moveable wall portion 202 from the hydraulic fluid 208. This causes the moveable wall portion 202 to return to the first position.

Thus a bump of the shock absorber 200 may be effected by controlling fluid flow at the hydraulic control port 204 in order to move the moveable wall portion 202.

In the event that the pressure at the hydraulic control port 204 decreases inadvertently (for example due to a leakage in a hydraulic supply that supplies the hydraulic control port 204) the moveable wall portion 202 will return to the first position, which is the standard operating condition of the shock absorber 200. Because the chamber 203 is completely sealed, the shock absorber fluid 108 will remain in the shock absorber 200 in the event of a leak in the hydraulic supply to the hydraulic control port 204. Thus the shock absorber is arranged to fail to safety in the event of such a leak.

Figure 4:
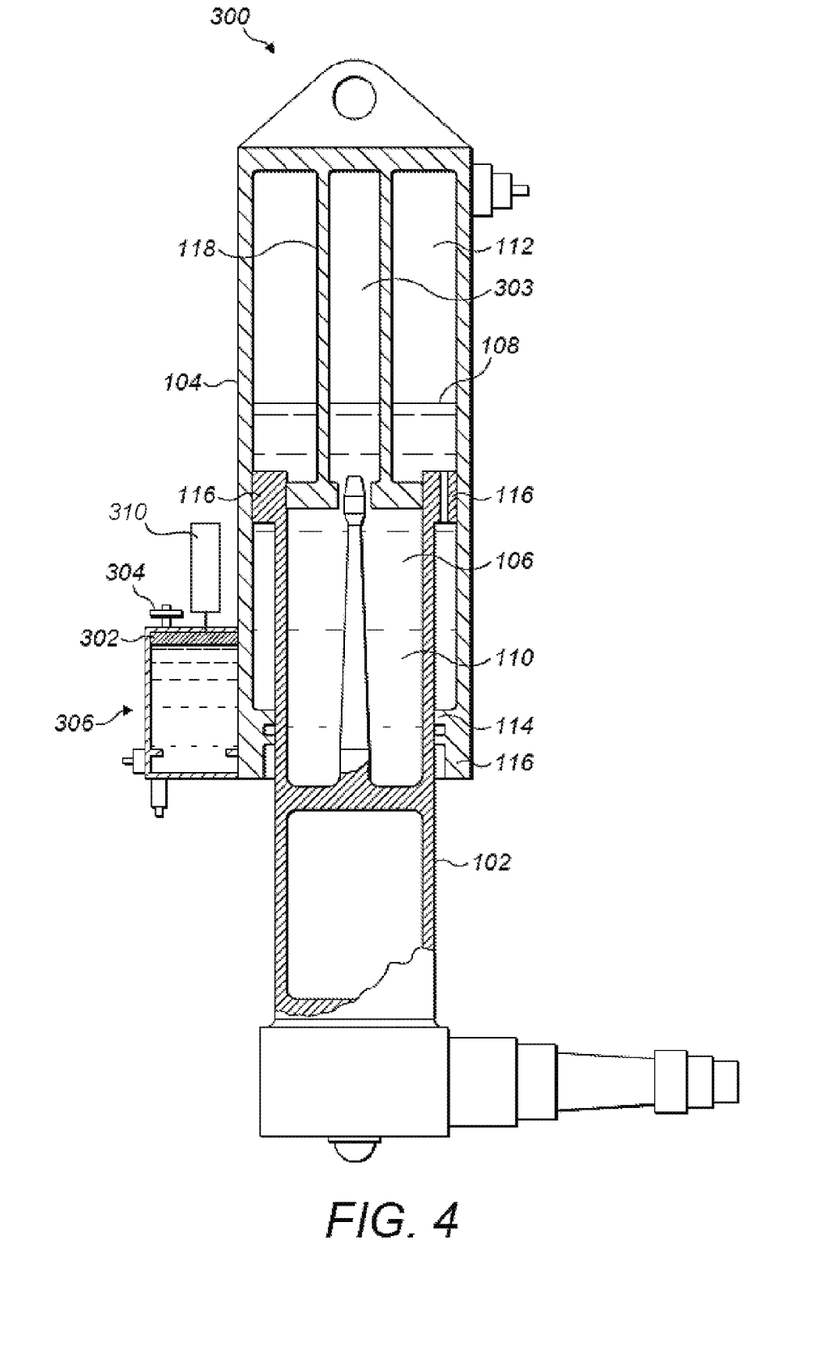
FIG. 4 is a schematic representation of a shock absorber according to a second embodiment, with a moveable wall portion shown in a first position.
Figure 5:
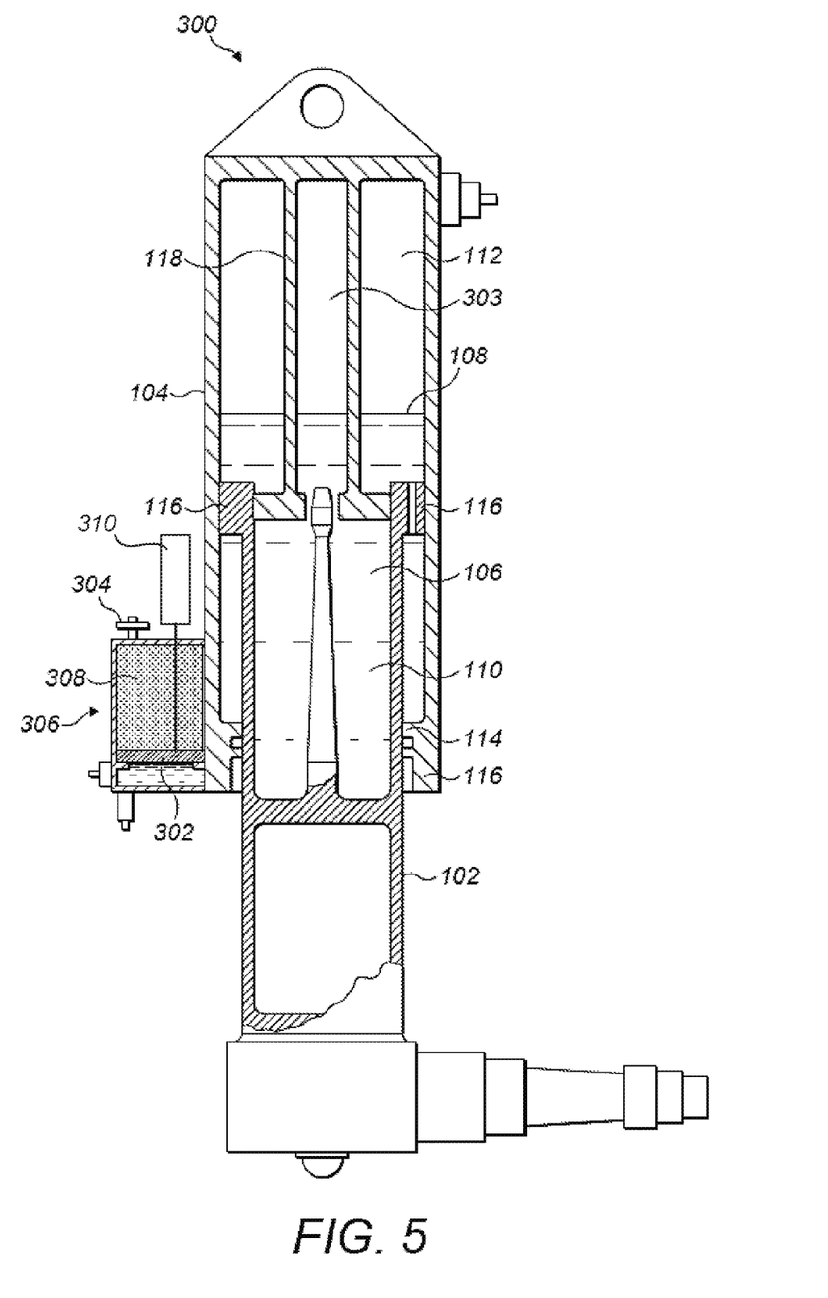
FIG. 5 is a schematic representation of the shock absorber of FIG. 4, with the moveable wall portion shown in a second position.

In FIGS. 4 and 5, an aircraft landing gear shock absorber according to a second embodiment is shown generally at 300. The shock absorber is similar to the shock absorber shown in FIGS. 1, 2 and 3, and like parts are labelled with like numerals.

The shock absorber 300 of the second embodiment includes a moveable wall portion 302 which is controlled by a hydraulic control port 304. However, in the second embodiment the shock absorber 300 further comprises a chamber extension unit 306. The chamber extension unit 306 is directly fixed to a port (such as an oil fill port) in the outer housing portion 104 so that the chamber extension unit 306 is in direct fluid communication with an internal cavity 106 of the shock absorber 300 and the chamber extension unit 306 forms an integral part of the shock absorber 300. Thus the chamber extension unit 306 and the internal cavity 106 together define a chamber 303 which defines a sealed fluid volume that contains shock absorber fluid 108.

In the second embodiment, the moveable wall portion 302 is a floating piston located in the chamber extension unit 306. The moveable wall portion 302 has a profile that corresponds to an internal profile of the chamber extension unit 306 so that the moveable wall portion 302 can slide within the chamber extension unit 306 whilst maintaining a fluid tight seal with the walls of the chamber extension unit 306.

The shock absorber of FIG. 4 further comprises a hydraulic control port 304 in fluid communication with a portion of the chamber extension unit 306, on an opposite side of the moveable wall portion 302 from the chamber 303 containing the shock absorber fluid 108. When the shock absorber 300 is included in an aircraft, the hydraulic control port 304 may be connected to a control valve which may in turn be connected to the aircraft hydraulic return.

In FIG. 4, the moveable wall portion 302 is shown in a first position in which it abuts a first wall of the chamber extension unit 306 and covers the hydraulic control port 204. Thus, when hydraulic fluid 308 exits the hydraulic control port 304 (as shown in FIG. 5), pressure is exerted on the moveable wall portion 302 which causes the moveable wall portion 302 to slide within the chamber extension unit 306.

The moveable wall portion 302 slides down the chamber extension unit 306 under pressure from the hydraulic control port 304, until it reaches a second position in which it contacts a second wall of the chamber extension unit 306 which is opposite the first wall of the chamber extension unit 306.

Additionally or alternatively, the supply of hydraulic fluid to the chamber extension unit 306 is limited by the hydraulic control port 304 so that the moveable wall portion 302 is held in the second position by the relative pressure exerted on the moveable wall portion 302 by the hydraulic fluid 308 and the shock absorber fluid 108.

FIG. 5 shows the moveable wall portion 302 in the second position. The portion of the chamber extension unit 306 between the moveable wall portion 302 and the hydraulic control port 304 is filled with hydraulic fluid 308, which exerts pressure on the moveable wall portion 302 to retain the moveable wall portion 302 in the second position.

When the moveable wall portion 302 is in the second position, the volume of the chamber 303, and thus the sealed fluid volume, is effectively decreased. The decrease in the sealed fluid volume causes an increase in pressure of the shock absorber fluid 108. This in turn causes an expansion of the shock absorber 300 such that the shock absorber fluid pressure returns to an equilibrium. The expansion of the shock absorber 300 is enough to overcome the stiction caused by the seals 114 and bearings 116.

Withdrawal of fluid through the hydraulic control port 304 decreases the pressure behind the moveable wall portion 302 such that the pressure exerted on the moveable wall portion 302 by the shock absorber fluid 108 is greater than the pressure exerted on the moveable wall portion 302 by the hydraulic fluid 308. This causes the moveable wall portion 302 to return to the first position.

Thus a bump of the shock absorber may be effected by controlling fluid flow at the hydraulic control port in order to move the moveable wall portion 302, between the first and second positions. Alternatively, the moveable wall portion can be moveable from the second position to the first position by an electrical actuator 310. For example, the moveable wall portion may be actuated using a linear ball screw actuator.

In the event that the pressure at the hydraulic control port 304 decreases inadvertently (for example due to a leakage in a hydraulic supply that supplies the control port) the moveable wall portion 302 will return to the first position, which is the standard operating condition of the shock absorber 300. Because the chamber 303 is completely sealed, the shock absorber fluid 108 will remain in the shock absorber 300 in the event of a leak in the hydraulic supply to the control port 304. Thus the shock absorber 300 fails to safety in the event of such a leak.

As the chamber extension unit 306 is an extension of the internal cavity 106 and is directly attached to the shock absorber housing (102, 104), there are no tubes or pipes between the chamber extension unit 306 and the rest of the chamber defined by the internal cavity 106. This ensures that there are no possible leakage paths within the chamber 303, and that the shock absorber fluid 108 is retained in the shock absorber 300 at all times.

The chamber extension unit 306 can be retrofitted to existing landing gear shock absorbers by replacing a changeover valve manifold of a conventional landing gear shock absorber with a chamber extension unit. If the chamber extension unit replaces a changeover valve manifold, the standard functionality of the changeover valve manifold could also be included in the chamber extension unit.

Figure 6:
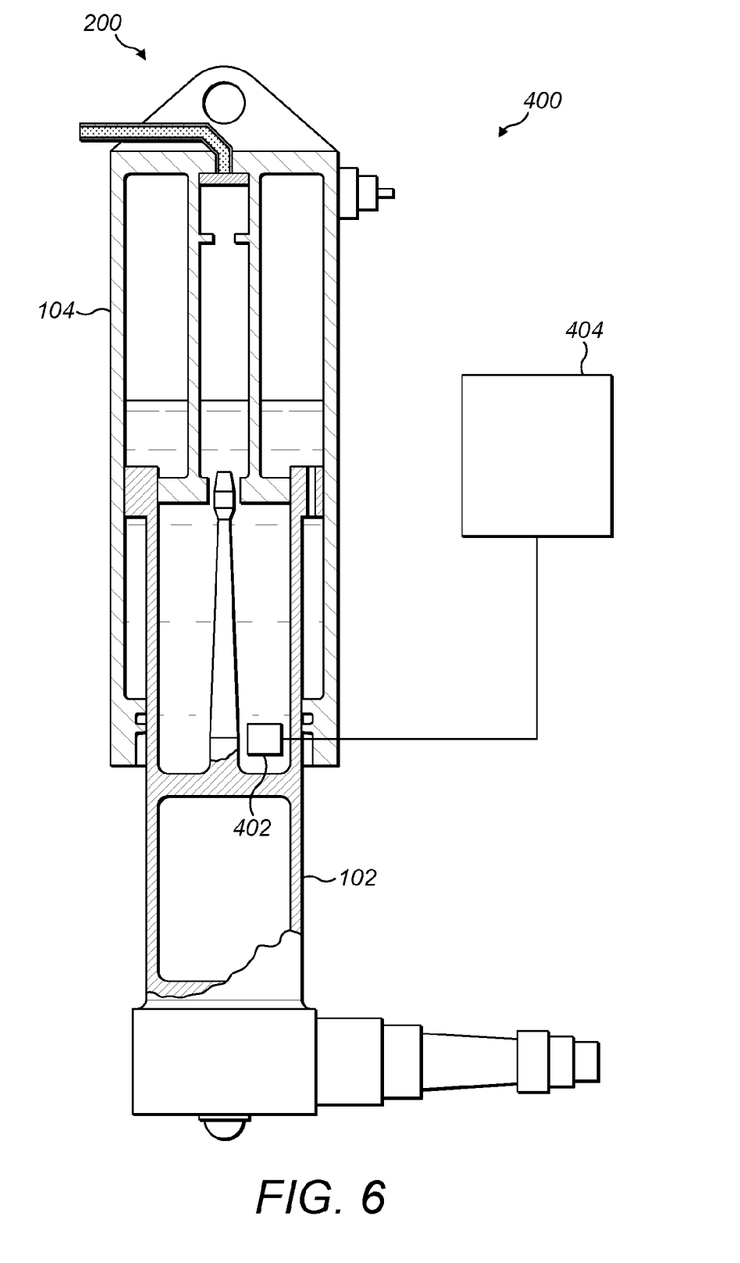
FIG. 6 is a schematic representation of a weight and balance system, according to a third embodiment.

FIG. 6 shows a weight and balance system according to a third embodiment generally at 400. The weight and balance system of the third embodiment comprises an aircraft landing gear shock absorber 200, shown in FIGS. 2 and 3 (although in another embodiment the weight and balance system can comprise the landing gear shock absorber 300, shown in FIGS. 4 and 5). The weight and balance system 400 further comprises a pressure sensor 402 located in the shock absorber 200, suitable for measuring the internal fluid pressure in the shock absorber. An output of the pressure sensor 402 is connected to a weight and balance measurement unit 404 which is arranged to calculate and the load on the landing gear shock absorber from the values measured by the pressure sensor 402. Weight and balance measurement unit 404 may also be arranged to provide a shock absorber bump, by controlling a control valve connected to supply control port 204.

Multiple landing gear of an aircraft can be connected to the same weight and balance measurement unit 404, which is arranged to calculate a difference in pressure between the multiple landing gear to check the balance of the aircraft (that the weight is distributed correctly).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft weight and balance measurement system including a landing gear shock absorber comprising:
    an inner housing portion slidably coupled within an outer housing portion, the shock absorber including a chamber which defines a sealed fluid volume for containing shock absorber fluid within the shock absorber;
    a moveable wall portion located in the chamber and arranged to be moved by a motive force between a first position and a second position, wherein in the second position an effective volume of the chamber is decreased relative to when the moveable wall portion is in the first position such that the shock absorber fluid pressure increases to extend the shock absorber;
    an aircraft weight and balance measurement unit including a pressure sensor located in the shock absorber to measure the pressure of the shock absorber fluid; and
    a motive force provider configured to generate the motive force to move the moveable wall from the first position to the second position to cause the inner portion to slide relative to the outer portion to extend the shock absorber and subsequently remove the motive force to move the moveable wall from the second position to the first position to cause the inner portion to slide relative to the outer portion to shorten the shock absorber;
    wherein the shock absorber comprises first and second stops, positionally fixed relative to the inner or outer housing portion, the first stop being positioned to contact and hold the moveable wall at the first position when the motive force is not being generated, and the second stop being positioned to contact and hold the movable wall at the second position when the motive force is being generated.

2. The aircraft weight and balance measurement system according to claim 1, further comprising a control port in fluid communication with a distal side of the moveable wall portion with respect to the chamber, the control port being arranged to be coupled to a source of control fluid for providing the motive force to move the moveable wall portion from the first position to the second position, wherein the control port is isolated from the sealed fluid volume by the moveable wall portion.

3. The aircraft weight and balance measurement system according to claim 2 wherein the control port is a hydraulic control port.

4. The aircraft weight and balance measurement system according to claim 2 wherein the moveable wall portion is moveable from the second position to the first position by shock absorber fluid pressure within the chamber.

5. The aircraft weight and balance measurement system according to claim 4 wherein the moveable wall portion is a floating piston.

6. The aircraft weight and balance measurement system according to claim 1 wherein the moveable wall portion is moveable from the second position to the first position by an electrical actuator.

7. The aircraft weight and balance measurement system according to claim 1 wherein the chamber is housed completely within an internal cavity defined by the inner and outer housing portions.

8. The aircraft weight and balance measurement system according to claim 1 wherein the shock absorber includes an orifice support tube and the chamber is partially defined by side walls of the orifice support tube.

9. The aircraft weight and balance measurement system according to claim 1 wherein the chamber is partially located in an internal cavity defined by the inner and outer housing portions and partially located in a chamber extension unit which is directly fixed to a port in the outer housing portion so that the chamber extension unit is in direct fluid communication with the internal cavity.

10. The aircraft weight and balance measurement system according to claim 1, wherein the movable wall portion is in the first position during normal operation of the shock absorber.

11. An aircraft landing gear including a weight and balance measurement system according to claim 1.

* * * * *